March 5, 1940.  A. E. LOOKHOLDER  2,192,232
INNER TUBE TESTING MEANS
Filed June 10, 1938
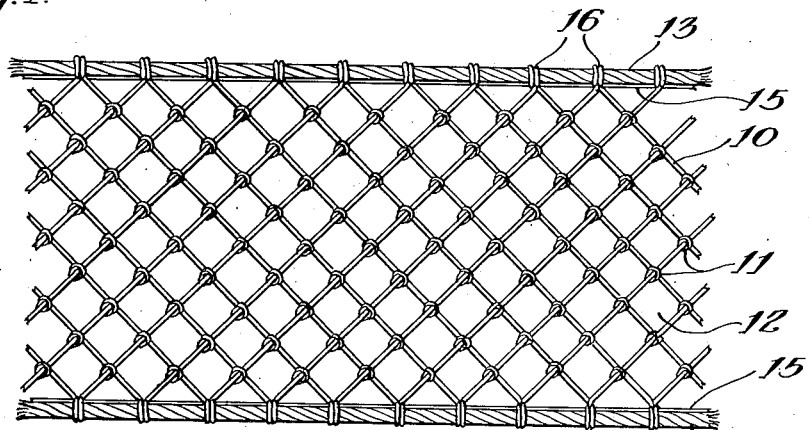
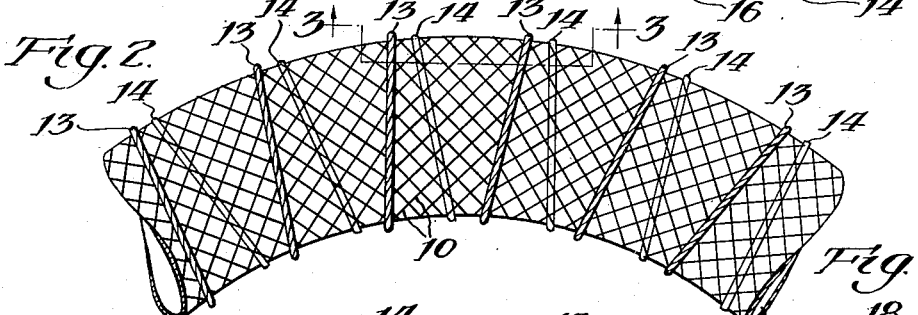
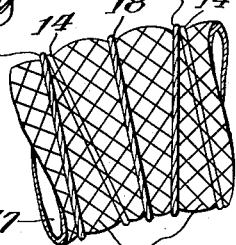
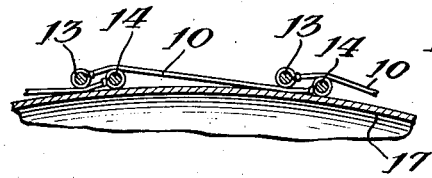
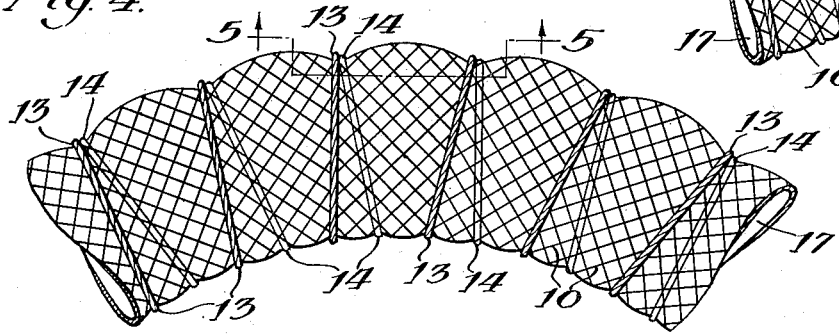
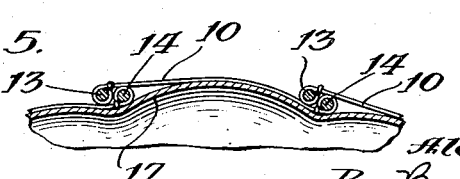
Inventor:
Alex E. Lookholder,
By Bertha L. MacGregor
Attorney.

Patented Mar. 5, 1940

2,192,232

UNITED STATES PATENT OFFICE 2,192,232

INNER TUBE TESTING MEANS

Alex E. Lookholder, La Grange, Ill.

Application June 10, 1938, Serial No. 213,006

4 Claims. (Cl. 73—51)

This invention relates to rubber inner tube testing means for testing such inner tubes for the purpose of detecting imperfections.

It is customary to inflate the tube to be tested and to immerse it in water, whereupon air bubbles will indicate the location of certain imperfections in the tube. The inflation is usually limited to six or seven ounces of air pressure because injury to the tube results when the unprotected tube is allowed to stretch, under increased pressure, to dimensions greater than its size when encased in a conventional outer casing. The relatively low air pressure heretofore used for testing purposes is sufficient to disclose some punctures, and particularly those which extend through the tube wall, but frequently the smaller and incomplete punctures or porous condition of the tube wall are not disclosed by the conventional testing means.

The object of my invention is to provide means for reinforcing the tube to be tested to permit inflation of the tube under radically increased air pressure, say eight to ten pounds pressure, without stretching the tube injuriously, whereby all the imperfections of the tube may be detected by immersing the inflated tube and reinforcing means in water.

The said reinforcing means may be constructed in various ways, it being essential that stretching of the tube be limited by the reinforcing means while visibility of the tube is maintained and the outward passage of air through punctures is not prevented by said reinforcing means.

Preferably, the reinforcing means is made in the form of a strip which is of such width and length that it can be wrapped in overlapped relation around a lightly inflated tube, to overlie the entire surface not only when the tube is lightly inflated but also when the air pressure and the tube dimensions are increased. The material of which the strip is made may vary, also, it being practical to use any flexible mesh or apertured material having tensile strength sufficient to withstand the tension resulting from expansion of the tube under pressure.

In the drawing:

Fig. 1 is a plan view of part of one form of tube reinforcing means, embodying my invention, for use in inner tube testing.

Fig. 2 shows part of an inner tube, inflated with air under low pressure, with the reinforcing means of Fig. 1 wrapped about the tube.

Fig. 3 is an enlarged sectional view taken on the line 3—3 of Fig. 2.

Fig. 4 shows the tube and wrapping of Fig. 2 after the air pressure in the tube has been substantially increased.

Fig. 5 is an enlarged sectional view taken on the line 5—5 of Fig. 4.

Fig. 6 is a fragmentary view similar to Fig. 4, showing part of an inflated tube and a modified form of reinforcing means.

In that embodiment of the invention shown in the drawing, the tube reinforcing means consists of a strip, approximately five inches in width and long enough to be wrapped around an inner tube in overlapped relation, the strip being made of flexible cord 10 knotted as indicated at 11 to form a mesh having openings 12 approximately three-quarters of an inch square. One of the longitudinal edges of the mesh strip is tied to a relatively thick cord 13 and the opposite edge is similarly tied to a relatively thick cord 14, by means of a smaller cord 15, knotted at spaced points as indicated at 16. The strip thus constructed is flexible and is adapted to be wrapped about an inner tube 17 which has been inflated with air under low pressure, as indicated in Fig. 2, in partially overlapped relation, so that the tube 17 will be adequately reinforced when the air pressure in the tube has been increased, as shown in Fig. 3.

The width of the strip may be varied and, if desired, a center cord or tape 18 may be provided, midway between the cords 13 and 14, as shown in the modified form in Fig. 6.

After the strip has been wrapped around the tube 17, the free end of the strip may be secured to an underlying turn of the wrapping or it may be tucked in under another part of the strip without special fastening means, for the strip will be placed under tension and remain securely in place when the air pressure is increased, as heretofore explained, from six or seven ounces to seven or more pounds. The increased pressure causes the tube 17 to stretch slightly between the cords 13 and 14, or 13, 18 and 14, as indicated in Figs. 4 and 6, but the reinforcing means limits the stretching and prevents injury to the tube, while the passage of air outwardly under the increased pressure reveals all the tube imperfections when the tube is placed in water.

The limited expansion of the tube 17 under increased pressure causes the cord 13 of one turn of the strip and the cord 14 of the underlying turn of the strip to move toward each other, as indicated in Figs. 2, 3, 4 and 5, and when they reach contacting positions, shown in Figs. 4 and 5, at the outer or peripheral portion of the tube, the tension on the cords in a direction radially of the tube is such that they remain in engagement and prevent one turn of the strip from slipping entirely out from under the overlying turn.

The invention may be embodied in a wide variety of forms and materials, and I do not intend to be limited to the specific embodiment which I have chosen to illustrate the invention.

I claim:

1. An inner tube testing device comprising a relatively long and narrow strip of deformable meshlike material having free, unconnected ends and relatively inflexible thickened longitudinal edges, said strip being adapted to be wrapped around a tube spirally, each turn of the strip being in partially overlying relation to an adjacent turn when the strip has been wrapped around the tube, and the inner sides of said thickened edges of adjacent turns engaging each other on the tube when the pressure in the tube is increased.

2. An inner tube testing device comprising a strip of deformable meshlike material having free, unconnected ends and substantially straight side edges, said strip being of such length as to be wrapped spirally completely around an inner tube when partially inflated, and of such width as to have its sides extending in overlapping relation to an adjacent turn upon the tube, whereby upon increased inflation of the wrapped tube the extent of spiral overlapping of the strip sides will be diminished with increased frictional engagement between the tube and wrapping without separation thereof.

3. An inner tube testing device comprising a strip of deformable meshlike material having free, unconnected ends and substantially straight side edges, said strip being of such length as to be wrapped spirally completely around an inner tube when partially inflated, and of such width as to have its sides extending in overlapping relation to an adjacent turn upon the tube, and interengaging means at the side edges of said strip adapted to prevent lateral separation of superimposed strip portions during increased inflation for testing of said tube.

4. An inner tube testing device comprising a strip of deformable meshlike material having free, unconnected ends and substantially straight, thickened side edges, said strip being long enough to be wrapped spirally around and to cover completely an inner tube when partially inflated, said strip being of such width as to be in partially overlying relation to an adjacent turn when the strip has been wrapped around a partially inflated tube, whereby increased inflation of the wrapped tube will result in diminishing the extent of overlapping and cause the thickened edges of adjacent turns of the strip to engage each other at the outer circumferential portion of the tube and prevent uncovering of any portion of the tube.

ALEX E. LOOKHOLDER.